(No Model.)

E. CHATAIN & S. GILETTI.
MANUFACTURE OF ARTIFICIAL GRANITE AND VENEERING STONE.

No. 512,431. Patented Jan. 9, 1894.

Witnesses:

Inventors,
Evariste Chatain
Secondo Giletti
By Dewey & Co., Attys.

UNITED STATES PATENT OFFICE.

EVARISTE CHATAIN AND SECONDO GILETTI, OF SAN FRANCISCO, CALIFORNIA.

MANUFACTURE OF ARTIFICIAL GRANITE AND VENEERING STONE.

SPECIFICATION forming part of Letters Patent No. 512,431, dated January 9, 1894.

Application filed June 11, 1892. Serial No. 436,350. (No specimens.)

*To all whom it may concern:*

Be it known that we, EVARISTE CHATAIN and SECONDO GILETTI, citizens of the United States, residing in the city and county of San Francisco, State of California, have invented an Improvement in the Manufacture of Artificial Granite and Veneering Stone; and we hereby declare the following to be a full, clear, and exact description of the same.

Our invention relates to the manufacture of artificial granite and veneering stone.

It consists in certain details of construction which will be more fully explained by reference to the accompanying drawings, in which—

Figure 1:
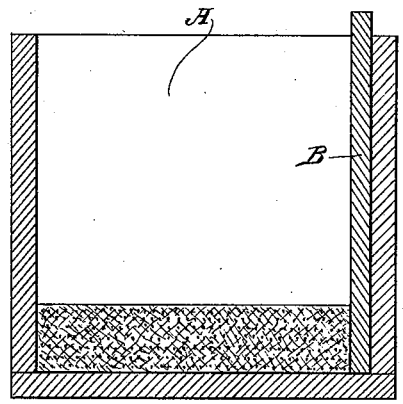
Figure 2:
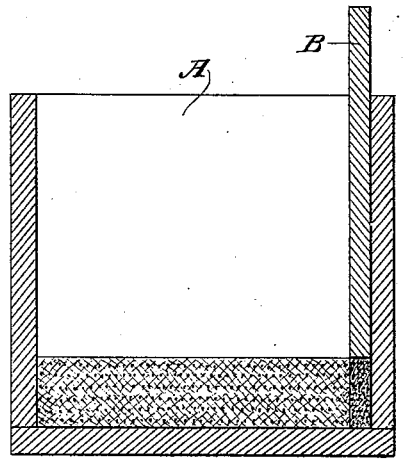

Figure 1 is a sectional view showing the manner of commencing the work, and Fig. 2 is a similar view showing the first layer of the block and its facing and veneer.

In the manufacture of artificial granite and other stone having a facing or veneering of any description differing from the interior composition of the block, it is necessary to so prepare the material that while the exterior and interior portions are distinct from each other they will be allowed to meet and unite on their meeting faces while still in a plastic condition so as to practically become a single solid block when finished. In the manufacture of such stone, we employ a mold A of the shape required for the desired face of the stone. B is a slide moving within the mold, this slide being of a thickness equal to that of the veneer which is to be applied to the front of the block. In the case of granite, this material is formed of colored silicious and other rock broken to the proper size, and so mixed as to imitate the peculiar surface of granite, and any other suitable style of veneering may be applied in a similar manner. This material which forms the body of the block is properly prepared to cause it to set and unite firmly and is then tamped down all around within the mold and the movable slide, until a certain depth has been filled from the bottom. The slide is then drawn up a short distance and the material of which the facing or veneering of the block is to be made is filled in to the space left by drawing up the slide, and is sufficiently plastic so that its surface unites with the surface of that portion of the body of the block which has already been filled in, and the two parts being still in a plastic condition will unite firmly and eventually set so as to become a single homogeneous block. The slide may now be replaced and another portion of the space within the mold is now filled with the compound which forms the body, and tamped as before, and the slide is again raised, and the main channel thus left is filled with the material of which this portion is to be formed, which is tamped as before so as to unite with that already in the mold. This operation is carried on in this manner until the mold is filled, and the block is completed, and is allowed to set in the usual manner after which the mold is removed and the faces of the block are polished and finished as may be desired. It will be manifest from this manner of constructing the block that it is only necessary for us to use a thickness of about one inch of the peculiar material which is necessary to form the veneering or facing of the block, while the remainder of the block may be made up of any of the usual or ordinary forms of material used for the manufacture of artificial stone, and when the whole block is set it is perfectly homogeneous and solid and fit for use in any place where ordinary granite or other rock is employed. Any form of block or column having a variety of faces may be made in this manner, and the faces may be colored to suit the requirements or taste.

It will be noticed that we do not in our method apply the outer facing or veneer to the upper surface of the various layers of the body of the block but only to the vertical side face or faces and hence we are enabled to build up layer by layer a complete block of any desired thickness.

Having thus described our invention, what we claim as new, and desire to secure by Letters Patent, is—

The herein described method of manufacturing granite or other artificial stone which consists in first tamping a layer of the body-forming material in a mold; one inner vertical wall of which is formed by a vertically movable slide, then removing the slide and tamping a layer of the facing-material in the space formed by the lower end of the slide; then replacing the slide with its lower end resting on the tamped facing-layer; then tamping a second body-forming layer, then again removing the slide and tamping a second facing layer in the space formed by its removal and continuing said steps in the above stated order until a faced block of the desired thickness is produced, substantially as herein described.

In witness whereof we have hereunto set our hands.

EVARISTE CHATAIN.
SECONDO GILETTI.

Witnesses to E. Chatain:
S. H. NOURSE,
H. F. ASCHECK.

Witnesses to S. Giletti:
JAS. F. WHITLOCK,
W. J. WHITLOCK.